United States Patent
Choi et al.

(10) Patent No.: US 10,193,654 B2
(45) Date of Patent: Jan. 29, 2019

(54) FRAME TRANSMISSION METHOD AND WIRELESS COMMUNICATION APPARATUS PERFORMING THE SAME

(71) Applicant: ELECTRONICS AND TELECOMMUNICATIONS RESEARCH INSTITUTE, Daejeon (KR)

(72) Inventors: Jee Yon Choi, Daejeon (KR); Jae Woo Park, Daejeon (KR); Moon Sik Lee, Daejeon (KR); Young Hoon Kim, Daejeon (KR); Gyung Chul Shin, Daejeon (KR); Jae Seung Lee, Daejeon (KR); Hoo Sung Lee, Daejeon (KR); Ik Jae Chun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 73 days.

(21) Appl. No.: 15/364,389

(22) Filed: Nov. 30, 2016

(65) Prior Publication Data
US 2017/0155470 A1   Jun. 1, 2017

(30) Foreign Application Priority Data

Nov. 30, 2015 (KR) .................. 10-2015-0169204
Dec. 17, 2015 (KR) .................. 10-2015-0180974
(Continued)

(51) Int. Cl.
H04L 1/00   (2006.01)
H04B 7/26   (2006.01)

(52) U.S. Cl.
CPC ......... *H04L 1/0008* (2013.01); *H04B 7/2612* (2013.01)

(58) Field of Classification Search
CPC ... H04L 1/0006–1/0008; H04L 1/0083; H04B 7/2656
See application file for complete search history.

(56) References Cited

U.S. PATENT DOCUMENTS 7,505,483 B2   3/2009   Jeon et al.
8,446,891 B2   5/2013   Choi et al.
(Continued)

FOREIGN PATENT DOCUMENTS

KR   10-2014-0084338 A   7/2014
WO   2012/021736 A1   2/2012

*Primary Examiner* — Pao Sinkantarakorn
(74) *Attorney, Agent, or Firm* — LRK Patent Law Firm

(57) ABSTRACT

A frame transmission method and a wireless communication apparatus performing the same. A frame transmission method performed by a first wireless communication apparatus includes receiving subframe unit length information of a second wireless communication apparatus from the second wireless communication apparatus, determining a subframe unit length of the first wireless communication apparatus based on the received subframe unit length information, generating a plurality of subframes based on the determined subframe unit length, and transmitting a frame in which the generated subframes are aggregated to the second wireless communication apparatus, and wherein, when at least one of the subframes includes a padding, a length of the padding allows a length of the at least one of the subframes including the padding to be a multiple of a natural number of the determined subframe unit length.

12 Claims, 7 Drawing Sheets

(30) Foreign Application Priority Data

Sep. 26, 2016 (KR) ........................ 10-2016-0123322
Nov. 21, 2016 (KR) ........................ 10-2016-0154737

(56) References Cited

U.S. PATENT DOCUMENTS

2012/0195301 A1* 8/2012 Choi .................... H04B 7/2656
370/338
2016/0302199 A1* 10/2016 Bharadwaj ............ H04L 1/0042

* cited by examiner

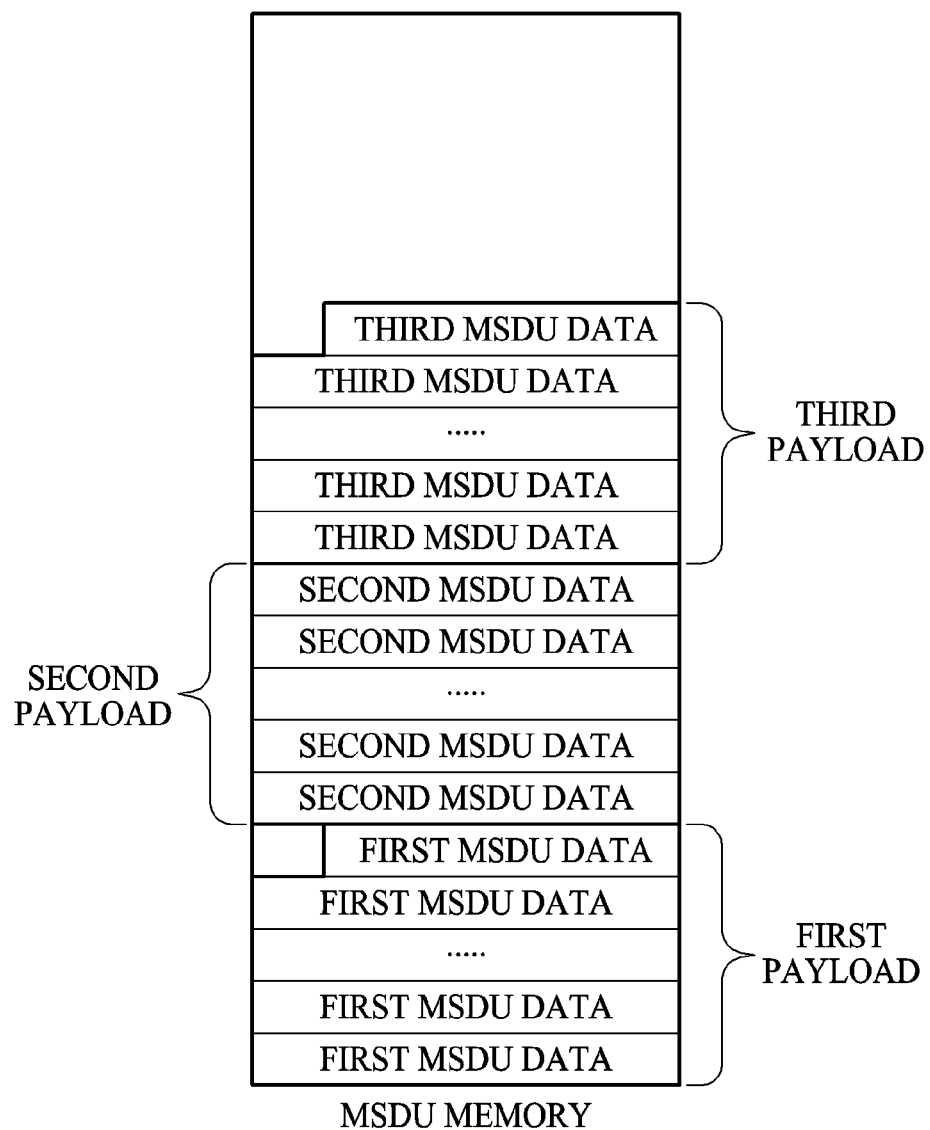

FRAME TRANSMISSION METHOD AND WIRELESS COMMUNICATION APPARATUS PERFORMING THE SAME

CROSS-REFERENCE TO RELATED APPLICATION(S)

This application claims the priority benefit of Korean Patent Application No. 10-2015-0169204, filed Nov. 30, 2015, Korean Patent Application No. 10-2015-0180974, filed Dec. 17, 2015, Korean Patent Application No. 10-2016-0123322, filed Sep. 26, 2016, and Korean Patent Application No. 10-2016-0154737, filed Nov. 21, 2016, in the Korean Intellectual Property Office, the disclosure of which is incorporated herein by reference for all purposes.

BACKGROUND

1. Field

One or more example embodiments relate to a frame transmission method and a wireless communication apparatus performing the same.

2. Description of Related Art

For wireless close proximity communication, there exists high rate wireless personal area network (WPAN) technology that supports a high transmission rate over a short distance. In a WPAN, a piconet may include at least one device and one piconet coordinator (PNC). A device associated with a parent piconet may become a PNC and thereby a child piconet may be formed. In a mesh network including a parent piconet and child piconets, a multi hop network is possible.

SUMMARY

According to an aspect, there is provided a frame transmission method performed by a first wireless communication apparatus, the method including receiving subframe unit length information of a second wireless communication apparatus from the second wireless communication apparatus, determining a subframe unit length of the first wireless communication apparatus based on the received subframe unit length information, generating a plurality of subframes based on the determined subframe unit length, and transmitting a frame in which the generated subframes are aggregated to the second wireless communication apparatus, wherein, when at least one of the subframes includes a padding, a length of the padding allows a length of the at least one of the subframes including the padding to be a multiple of a natural number of the determined subframe unit length.

The determined subframe unit length may be a greatest subframe unit length among subframe unit lengths supported by both the first wireless communication apparatus and the second wireless communication apparatus.

A last subframe among the subframes may not include the padding.

When the determined subframe unit length is N, the length of the padding may be one of 0 through N−1 and N is a natural number.

At least one of the subframes may include a payload and whether the padding is included in the at least one of the subframes is determined based on a length of the payload.

The subframe unit length information of the second wireless communication apparatus may be included in an association request frame transmitted by the second wireless communication apparatus.

The method may further include transmitting a beacon frame including subframe unit length information of the first wireless communication apparatus to the second wireless communication apparatus.

According to another aspect, there is provided a first wireless communication apparatus including a communicator configured to receive subframe unit length information of a second wireless communication apparatus from the second wireless communication apparatus, and a processor configured to determine a subframe unit length of the first wireless communication apparatus based on the received subframe unit length information and generate a plurality of subframes based on the determined subframe unit length, wherein, when at least one of the subframes includes a padding, a length of the padding allows a length of the at least one of the subframes including the padding to be a multiple of a natural number of the determined subframe unit length.

The determined subframe unit length may be a greatest subframe unit length among subframe unit lengths supported by both the first wireless communication apparatus and the second wireless communication apparatus.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 5A is a diagram illustrating a data form stored in a media access control service data unit (MSDU) memory according to an example embodiment;

DETAILED DESCRIPTION

Figure 1:
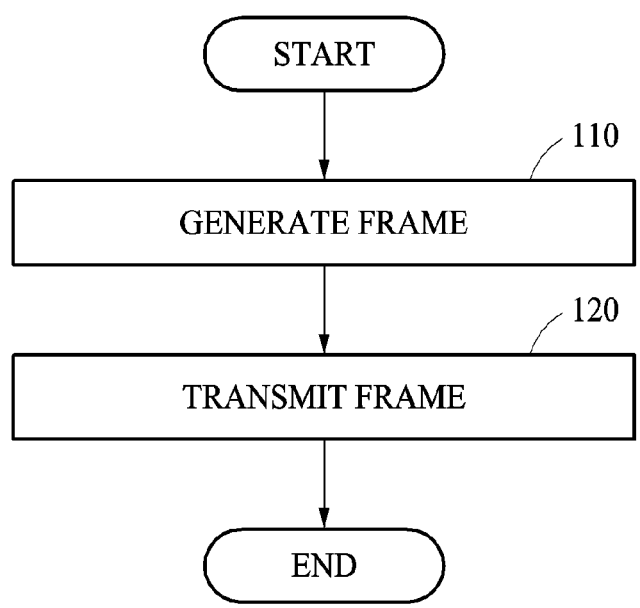
FIG. 1 is a flowchart illustrating a wireless communication method according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Terms such as first, second, A, B, (a), (b), and the like may be used herein to describe components. Each of these terminologies is not used to define an essence, order or sequence of a corresponding component but used merely to distinguish the corresponding component from other component(s). For example, a first component may be referred to a second component, and similarly the second component may also be referred to as the first component.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples are described in detail with reference to the accompanying drawings. Like reference numerals in the drawings denote like elements, and a known function or configuration will be omitted herein.

FIG. 1 is a flowchart illustrating a wireless communication method according to an example embodiment.

Referring to FIG. 1, the wireless communication method performed by a wireless communication apparatus may generate a frame, for example, a data frame and a communication frame, in a close proximity wireless communication system through below described processes and transmit the generated frame to another wireless communication apparatus. For example, the wireless communication apparatus may aggregate data of a media access control (MAC) packet and generate a MAC frame.

In operation 110, the wireless communication apparatus generates a frame including a plurality of MAC subframes. For example, the wireless communication apparatus may generate a MAC frame by aggregating a plurality of MAC subframes. Here, the wireless communication apparatus may add a padding, hereinafter also referred to as a PAD, being additional data for adjusting a length (or a size) of a subframe to at least one of subframes when needed. The padding may be provided, for example, in a bit unit or a byte unit, and a value of a bit string of the padding may be variously defined.

For example, a length of a padding to be included in a subframe may be determined based on a length of a payload of the subframe. The wireless communication apparatus may adjust the length of the subframe based on a unit for data processing and the length of the padding may be determined based on the corresponding unit for data processing. The wireless communication apparatus may generate a frame by connecting a plurality of subframes. A last subframe among the connected subframes may not include the padding according to an example embodiment. The wireless communication apparatus may store the generated frame in a frame memory.

In operation 120, the wireless communication apparatus may transmit the generated frame to another wireless communication apparatus. A subheader is included in the frame, and another wireless communication apparatus may obtain information for dividing the frame from information included in the subheader. Another wireless communication apparatus that receives the frame may separate the plurality of subframes from the frame based on the information included in the subheader.

Figure 2:
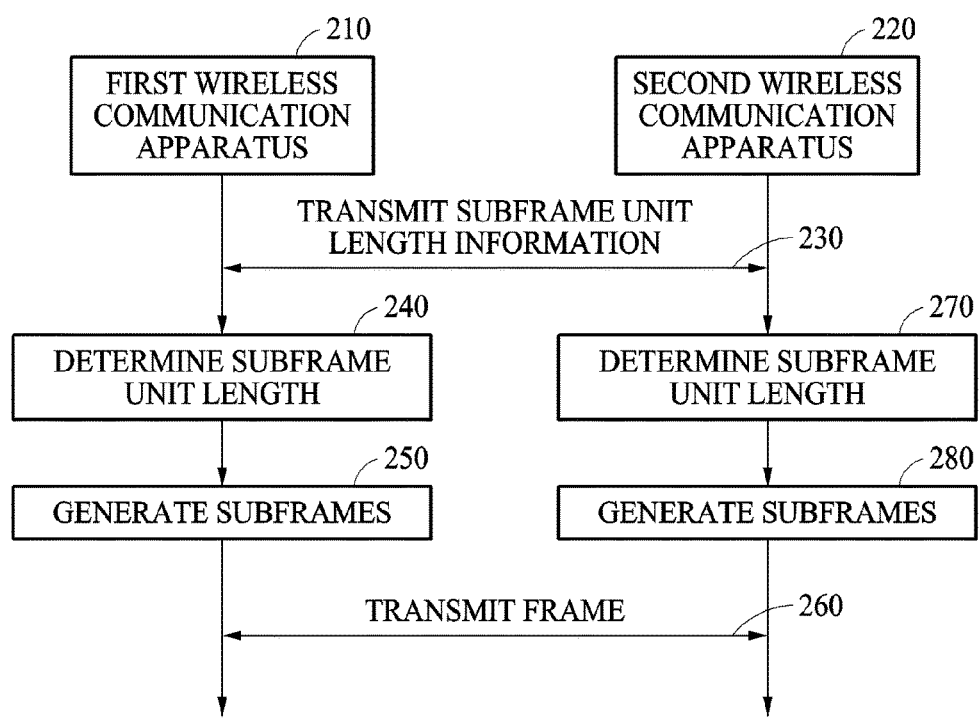
FIG. 2 illustrates a frame transmission method performed between wireless communication apparatuses according to an example embodiment.

FIG. 2 illustrates a frame transmission method performed between wireless communication apparatuses according to an example embodiment.

Referring to FIG. 2, at least one of a first wireless communication apparatus 210 and a second wireless communication apparatus 220 may generate a frame and transmit the frame to a counterpart apparatus.

The second wireless communication apparatus 220 transmits subframe unit length information of the second wireless communication apparatus 220 to the first wireless communication apparatus 210 in operation 230. The subframe unit length information of the second wireless communication apparatus 220 refers to information on a length of a subframe, and the information is a reference used for generating each subframe. The subframe unit length information of the second wireless communication apparatus 220 may be included in an association request frame transmitted by the second wireless communication apparatus 220.

The first wireless communication apparatus 210 receives the subframe unit length information of the second wireless communication apparatus 220 from the second wireless communication apparatus 220, and determines a subframe unit length of the first wireless communication apparatus 210 based on the received subframe unit length information in operation 240. For example, the first wireless communication apparatus 210 may determine, as the subframe unit length of the first wireless communication apparatus 210, a greatest subframe unit length among subframe unit lengths supported by both the first wireless communication apparatus 210 and the second wireless communication apparatus 220.

The first wireless communication apparatus 210 generates the subframes based on the determined subframe unit length in operation 250. The first wireless communication apparatus 210 may adjust a length of a subframe by adding a padding to the subframe when a length of a subframe to be generated is different from the determined subframe unit length. A length of a padding included in a subframe allows a length of the subframe including the padding to be a multiple of a natural number of the determined subframe unit length. The first wireless communication apparatus 210 may exclude the padding from the last subframe when the subframes are generated.

When the determined subframe unit length is N (natural number), the length of the padding may be one of 0 through N−1. The length of the padding being 0 indicates that the padding is not included in the subframe. The subframe may include a payload and whether the padding is included in the subframe may be determined based on a length of the payload. For example, when it is assumed that the determined subframe unit length is 4 bytes, a length of a header of the subframe is 4 bytes, and a length of a frame check sequence (FCS) is 4 bytes, (1) the length of the padding may be 0 bytes when the length of the payload of the corresponding subframe is 8 bytes (that is, the padding is not included), (2) the length of the padding may be 3 bytes when the length of the payload of the corresponding subframe is 9 bytes, (3) the length of the padding may be 2 bytes when the length of the payload of the corresponding subframe is 10 bytes, and (4) the length of the padding may be 1 byte when the length of the payload of the corresponding subframe is 11 bytes. According to another example, the length of the padding may be determined in bits.

The first wireless communication apparatus 210 generates a frame in which the subframes are aggregated and transmits the generated frame to the second wireless communication apparatus 220 in operation 260.

The first wireless communication apparatus 210 may also transmit subframe unit length information of the first wireless communication apparatus to the second wireless communication apparatus 220. Here, the first wireless communication apparatus 210 may add the subframe unit length information of the first wireless communication apparatus 210 to a beacon frame, and transmit the beacon frame to the second wireless communication apparatus 220. The second wireless communication apparatus 220 determines the subframe unit length based on the subframe unit length information of the first wireless communication apparatus 210 in operation 270. For example, the second wireless communication apparatus 220 may also determine, as the subframe unit length of the second wireless communication apparatus 220, the greatest subframe unit length among the subframe unit lengths supported by both the first wireless communication apparatus 210 and the second wireless communication apparatus 220. The second wireless communication apparatus 220 generates the subframes based on the determined subframe unit length in operation 280, and transmits the frame in which the subframes are aggregated to the first wireless communication apparatus 210.

Figure 3:
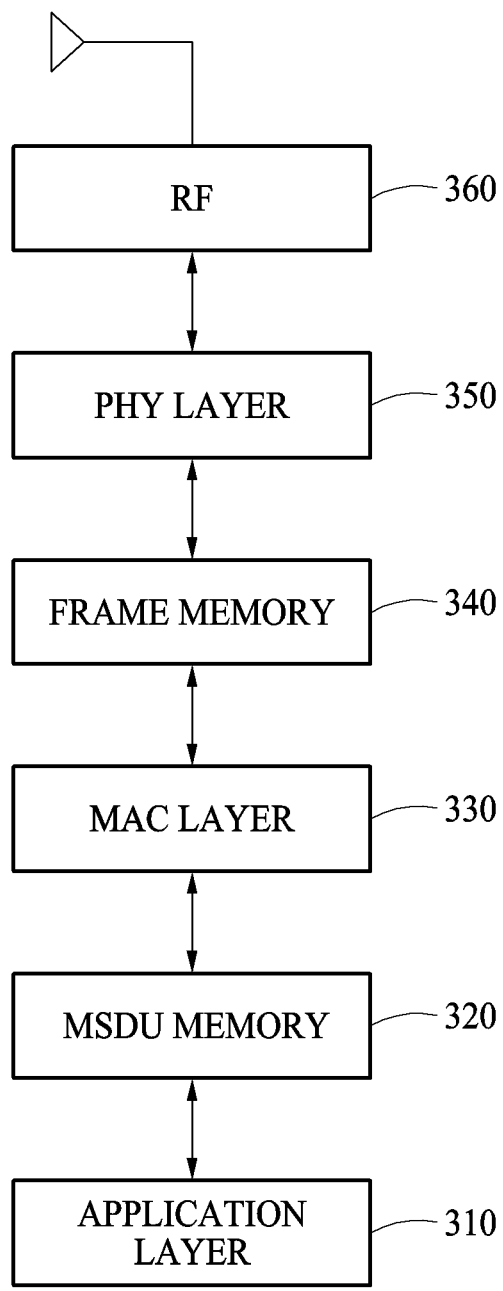
FIG. 3 is a block diagram illustrating a structure of a close proximity wireless communication system according to an example embodiment.

FIG. 3 is a block diagram illustrating a structure of a close proximity wireless communication system according to an example embodiment.

In an example, a wireless communication apparatus may store, in a media access control service data unit (MSDU) memory 320, data generated on an application layer 310 in a form of an MSDU. A MAC layer 330 may generate a MAC frame by reading the MSDU from the MSDU memory and store the generated MAC frame in a frame memory 340.

In an example, a physical (PHY) layer 350 of the wireless communication apparatus may generate a PHY frame by reading the MAC frame from the frame memory 340, and the generated PHY frame may be wirelessly transmitted through a radio frequency (RF) 360.

In an example, a process of receiving the PHY frame may be performed in a reverse order of a transmitting process described with reference to FIG. 3.

Figure 4:
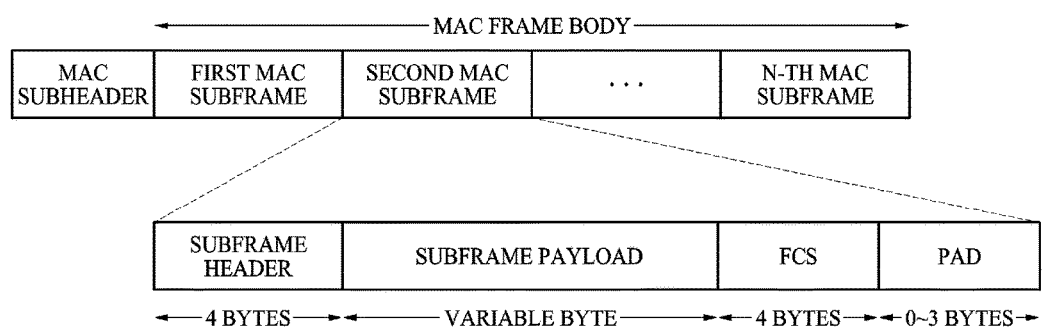
FIG. 4 is a diagram illustrating a structure of a media access control (MAC) frame body of an aggregated frame according to an example embodiment.
Figure 5B:
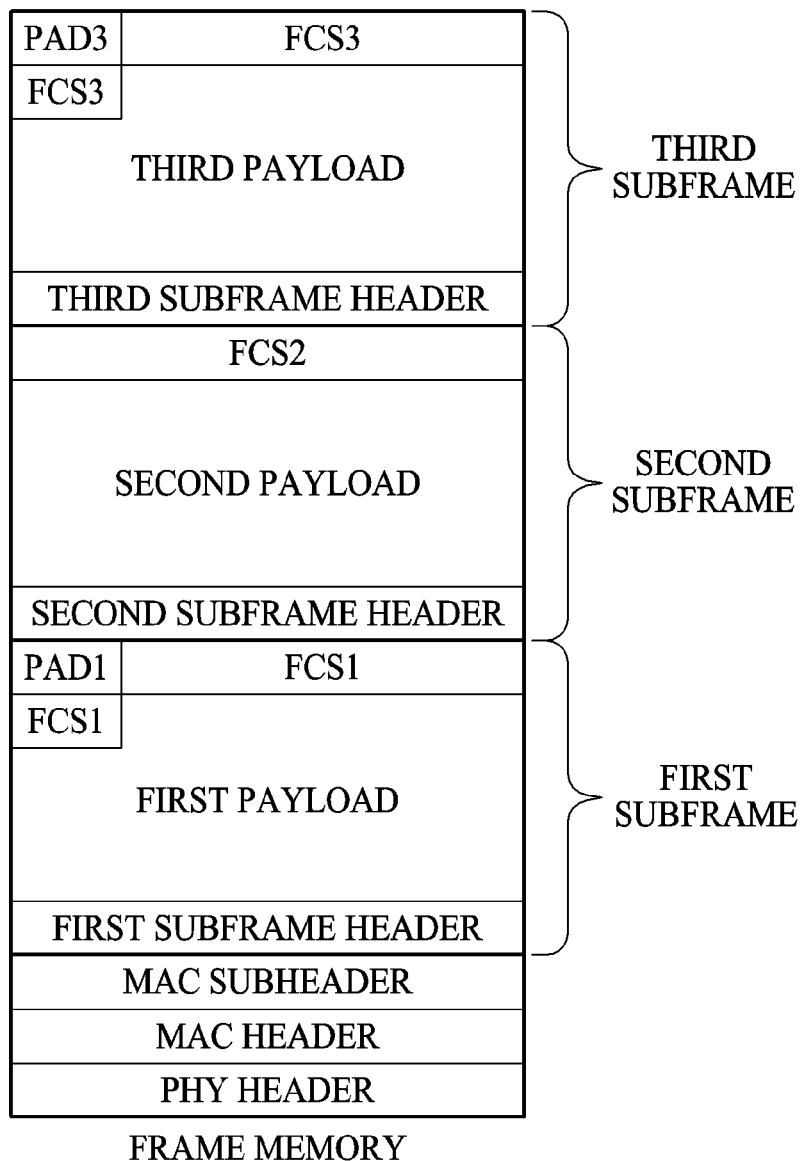
FIG. 5B is a diagram illustrating a data form stored in a frame memory according to an example embodiment.
Figure 6:
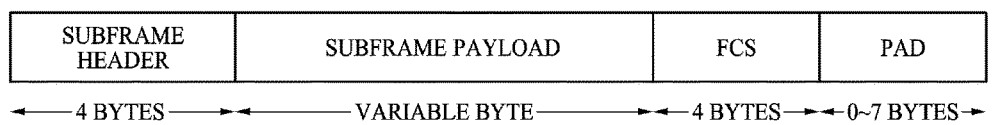
FIG. 6 is a diagram illustrating a structure of media access control (MAC) subframes according to an example embodiment.

Referring to FIGS. 4 through 6, a MAC frame is described as an example of a frame. However, a scope of an example is not limited to a MAC frame, and a technical description of the present disclosure may be also applicable even when various frames are generated.

FIG. 4 is a diagram illustrating a structure of a media access control (MAC) frame body of an aggregated frame according to an example embodiment. In an example, a wireless communication apparatus may use the aggregated frame to enhance an efficiency of data transmission. A structure of the aggregated frame may differ based on a physical (PHY) layer to be used.

Referring to FIG. 4, a frame check sequence (FCS) and a padding are added to a single MAC payload, and a subframe header is added based on an aggregation method to form a single MAC subframe. The padding may be additional data used for adjusting a length of the MAC subframe. The padding may be used as dummy data for adjusting the length of the MAC subframe.

In an example, a MAC frame body of the aggregated frame may include at least one MAC subframe. Here, a MAC subheader may be an optional header, and another wireless communication apparatus may receive the aggregated frame and include information required for separating the received aggregated frame. The MAC subheader may be transmitted and received on the PHY layer through a process that is the same as a process used to transmit a PHY header and a MAC header.

In an example, the MAC subframe included in the structure of the aggregated frame may include MSDU data being a payload, a 4-byte subframe header, and a 4-byte FCS. Because a payload of the subframe has a variable length, a 0 through 3-byte length of padding may be added based on the length of the payload. For example, when the length of the payload is 5 bytes, the length of the padding may be 3 bytes. As another example, when the length of the payload is 7 bytes, the length of the padding may be 1 byte. Here, although the padding may be composed of 0-bit and/or 1-bit units, a bit string configuration of the padding is not limited thereto.

FIG. 5A is a diagram illustrating a data form stored in a media access control service data unit (MSDU) memory according to an example embodiment.

As a transmission rate of a close proximity wireless communication is increased, data may be more frequently processed in 4-byte units in a close proximity wireless communication system. However, a volume of an MSDU memory formed on an application layer may have a byte unit. In this case, as illustrated in FIG. 5A, MSDU data stored in the MSDU memory may have an empty space in an end portion of the MSDU memory, similar to first MSDU data and third MSDU data.

However, the frame memory including an aggregated frame may not require an empty space. When a size of an end portion of the first MSDU data is 3 bytes, a size of an end portion of a first subframe may be also 3 bytes. Thus, 1-byte of data of each portion of a second subframe may be used to fill the empty space of the first subframe. In a receiving process, conversely, a process of using 1 byte of second MSDU data corresponding to a second payload of the second subframe may be required. In the close proximity wireless communication system, a process of using and filling a portion of data may be considerably inconvenient and cause a decrease in performance.

The present disclosure may solve such issue through the proposed aggregated frame structure, such that the close proximity wireless communication system may be easily implemented and performance of the close proximity wireless communication system may be enhanced.

FIG. 5B is a diagram illustrating a data form stored in a frame memory according to an example embodiment.

In an example, a wireless communication apparatus may store data in a frame memory as illustrated in FIG. 5B. A MAC subframe included in a structure of an aggregated frame may include MSDU data being a payload of a subframe, a 4-byte subframe header, and a 4-byte FCS. Also, a 0 through 3-byte length of padding may be added to a subframe based on a length of the payload. The padding may be additional data for adjusting a length of the subframe.

In an example, a length of the padding may be determined based on a length of the subframe or a length of the payload. For example, the wireless communication apparatus may determine the length of the padding such that the length of the MAC subframe is a multiple of 4 bytes corresponding to a unit length of the subframe. Here, the padding may include any type of data. For example, the padding may be filled with 0-bit and/or 1-bit units.

Referring to FIG. 5B, the padding may be included in each of the first subframe and the third subframe such that the length of the subframe is a multiple of a subframe unit length. When the length of the subframe is a multiple of the subframe unit length, the padding may not be included in the subframe as in the second subframe. For example, the wireless communication apparatus may exclude the padding from a last subframe to be included in the aggregated frame in order to enhance the transmission efficiency.

FIG. 6 is a diagram illustrating a structure of a media access control (MAC) subframe according to an example embodiment.

Referring to FIG. 6, when a unit for data processing in a close proximity wireless communication system is increased to be a 8-byte unit or a 16-byte unit other than a 4-byte unit, a wireless communication apparatus may adjust a length of a padding included in a media access control (MAC) subframe to be 0 bytes through 7 bytes (when the length of the MAC subframe is 8 bytes) or 0 bytes through 15 bytes (when the length of the MAC subframe is 17 bytes) such that the length of the MAC subframe is 8 bytes or 16 bytes.

In an example, the length of the padding may be determined based on bytes of the length of the MAC subframe. For example, when the length of the MAC subframe is 8 bytes, the length of the padding may be 0 bytes through 7 bytes in a structure of the MAC subframe. When the length of the MAC subframe is set to be N bytes, the length of the padding may be 0 bytes through N−1 bytes.

Based on a method used for implementing a system, data may be processed in a 4-byte unit or a 8-byte unit. When units of data processed by two systems are different, a system that processes data based on a relatively large unit for data processing may be used such that communication may be possible. Thus, in the present disclosure, wireless communication apparatuses may exchange respective pieces of subframe unit length information corresponding to information on a desired length of a MAC subframe before respective pieces of aggregated data are exchanged, such that the length of the MAC subframe to be exchanged by the wireless communication apparatuses may be determined based on the exchanged pieces of information. The wireless communication apparatus may compare the exchanged pieces of information and determine a subframe unit length of which a value is relatively great as a unit length to be applied to subframes to be generated.

The aforementioned process performed by the wireless communication apparatus may be performed in an association process of close proximity wireless communication. Subframe unit length information may be included in a capability information element included in a beacon frame, and an association request frame or an association response frame.

In an example, a first wireless communication apparatus may receive the subframe unit length information on the desired length of the MAC subframe from a second wireless communication apparatus. When the received subframe unit length information is greater than subframe unit length information of the first wireless communication apparatus, the first wireless communication apparatus may determine the length of the MAC subframe based on the received subframe unit length information. Here, the subframe unit length information may be included in the association request frame transmitted by the second wireless communication apparatus. In another example, the first wireless communication apparatus may transmit first subframe unit length information on the length of the MAC subframe to the second wireless communication apparatus, and receive second subframe unit length information on the length of the MAC subframe from the second wireless communication apparatus. The first subframe unit length information may be included in the beacon frame or the association response frame transmitted by the first wireless communication apparatus, and the second subframe unit length information may be included in the association request frame transmitted by the second wireless communication apparatus. The length of the MAC subframe to be generated by the first wireless communication apparatus may be determined based on subframe unit length information that is greater between the first subframe unit length information and the second subframe unit length information.

Figure 7:
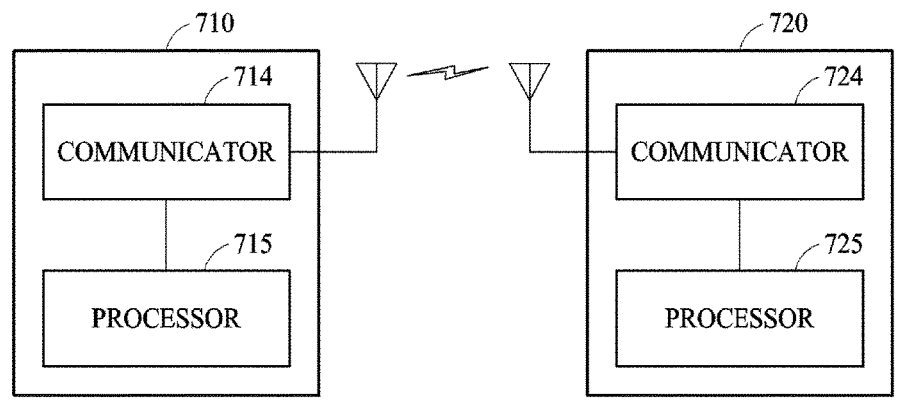
FIG. 7 is a block diagram illustrating a configuration of a first wireless communication apparatus and a second wireless communication apparatus for close proximity communication according to an example embodiment.

FIG. 7 is a block diagram illustrating a configuration of a first wireless communication apparatus and a second wireless communication apparatus for close proximity communication according to an example embodiment.

Referring to FIG. 7, a first wireless communication apparatus 710 and a second wireless communication apparatus 720 may correspond to the first wireless communication apparatus 210 and the second wireless communication apparatus 220 of FIG. 2, respectively.

The first wireless communication apparatus 710 includes a communicator 714 and a processor 715. The communicator 714 transmits a beacon, a frame, a signal, data, information, or subframe unit length information of the first wireless communication apparatus 710 to the second wireless communication apparatus 720, or receives a beacon, a frame, a signal, data, information, or subframe unit length information of the second wireless communication apparatus 720 from the second wireless communication apparatus 720.

The processor 715 may perform at least one of operations described with reference to FIGS. 1 through 6. For example, the processor 715 determines a subframe unit length of the first wireless communication apparatus 710 based on the subframe unit length information of the second wireless communication apparatus 720 and generates a plurality of subframes based on the determined subframe unit length. The processor 715 generates a frame by aggregating the generated subframes.

The second wireless communication apparatus 720 includes a communicator 724 and a processor 725. The communicator 724 transmits the frame, the signal, the data, the information, or the subframe unit length information of the second wireless communication apparatus 720 to the first wireless communication apparatus 710, or receives the frame, the signal, the data, the information, or the subframe unit length information of the first wireless communication apparatus 710 from the first wireless communication apparatus 710.

The processor 725 may perform at least one of operations described with reference to FIGS. 1 through 6. For example, the processor 725 determines the subframe unit length of the second wireless communication apparatus 720 based on the subframe unit length information of the first wireless communication apparatus 710, and generates the plurality of subframes based on the determined subframe unit length. The processor generates a frame by aggregating the generated subframes.

The components described in the exemplary embodiments of the present invention may be achieved by hardware components including at least one DSP (Digital Signal Processor), a processor, a controller, an ASIC (Application Specific Integrated Circuit), a programmable logic element such as an FPGA (Field Programmable Gate Array), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The apparatuses, units, modules, devices, and other components that are described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods described according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A frame transmission method performed by a first wireless communication apparatus, the method comprising:
   receiving subframe unit length information of a second wireless communication apparatus from the second wireless communication apparatus;
   determining a subframe unit length of the first wireless communication apparatus based on the received subframe unit length information;
   generating a plurality of subframes based on the determined subframe unit length; and
   transmitting a frame in which the generated subframes are aggregated to the second wireless communication apparatus,
   wherein, when at least one of the subframes includes a padding, a length of the padding allows a length of the at least one of the subframes including the padding to be a multiple of a natural number of the determined subframe unit length, and
   wherein the determined subframe unit length is a greatest subframe unit length among subframe unit lengths supported by both the first wireless communication apparatus and the second wireless communication apparatus.

2. The method of claim 1, wherein a last subframe among the subframes does not include the padding.

3. The method of claim 1, wherein, when the determined subframe unit length is N, the length of the padding is one of 0 through N−1 and N is a natural number.

4. The method of claim 1, wherein at least one of the subframes includes a payload and whether the padding is included in the at least one of the subframes is determined based on a length of the payload.

5. The method of claim 1, wherein the subframe unit length information of the second wireless communication apparatus is included in an association request frame transmitted by the second wireless communication apparatus.

6. The method of claim 1, further comprising:

transmitting a beacon frame including subframe unit length information of the first wireless communication apparatus to the second wireless communication apparatus.

7. A first wireless communication apparatus, the apparatus comprising:

a communicator configured to receive subframe unit length information of a second wireless communication apparatus from the second wireless communication apparatus; and a processor configured to determine a subframe unit length of the first wireless communication apparatus based on the received subframe unit length information and generate a plurality of subframes based on the determined subframe unit length, wherein, when at least one of the subframes includes a padding, a length of the padding allows a length of the at least one of the subframes including the padding to be a multiple of a natural number of the determined subframe unit length, and wherein the determined subframe unit length is a greatest subframe unit length among subframe unit lengths supported by both the first wireless communication apparatus and the second wireless communication apparatus.

8. The apparatus of claim 7, wherein a last subframe among the subframes excludes the padding.

9. The apparatus of claim 7, wherein, when the determined subframe unit length is N, the length of the padding is one of 0 through N−1 and N is a natural number.

10. The apparatus of claim 7, wherein at least one of the subframes includes a payload and whether the padding is included in the at least one of the subframes is determined based on a length of the payload.

11. The apparatus of claim 7, wherein the subframe unit length information of the second wireless communication apparatus is included in an association request frame transmitted by the second wireless communication apparatus.

12. The apparatus of claim 7, wherein the communicator is configured to transmit a beacon frame including subframe unit length information of the first wireless communication apparatus to the second wireless communication apparatus.

* * * * *